United States Patent
Blase

[19]

[11] Patent Number: 6,113,275
[45] Date of Patent: Sep. 5, 2000

[54] PLAIN BEARING

[75] Inventor: Frank Blase, Bergisch Gladbach, Germany

[73] Assignee: Igus Spritzgussteile fur die Industrie GmbH, Germany

[21] Appl. No.: 09/171,284

[22] PCT Filed: Apr. 15, 1997

[86] PCT No.: PCT/DE97/00769

§ 371 Date: Mar. 8, 1999

§ 102(e) Date: Mar. 8, 1999

[87] PCT Pub. No.: WO97/40281

PCT Pub. Date: Oct. 30, 1997

[30] Foreign Application Priority Data

Apr. 20, 1996 [DE] Germany .......................... 196 15 824

[51] Int. Cl.[7] .................................................. F16C 33/02
[52] U.S. Cl. ........................... 384/296; 384/42; 384/276; 384/906
[58] Field of Search .................................. 384/29, 37, 41, 384/42, 192, 202, 215, 220, 276, 295, 296, 297, 299, 300, 301, 906

[56] References Cited

U.S. PATENT DOCUMENTS

| | | | |
|---|---|---|---|
| 3,194,615 | 7/1965 | Weasler | 384/220 |
| 3,333,513 | 8/1967 | Wettstein | 384/29 |
| 3,362,765 | 1/1968 | Pierce | 384/220 X |
| 3,366,356 | 1/1968 | Fisher . | |
| 3,451,705 | 6/1969 | Turpen | 384/192 |
| 3,561,830 | 2/1971 | Orndorff, Jr. | 384/215 X |
| 3,637,273 | 1/1972 | Orndorff, Jr. . | |
| 3,771,846 | 11/1973 | Bass et al. | 384/125 |
| 3,929,392 | 12/1975 | Ogino | 384/215 |

FOREIGN PATENT DOCUMENTS

| | | |
|---|---|---|
| 337523 | 7/1990 | European Pat. Off. . |
| 2537674 | 6/1984 | France . |
| 21519 | 11/1955 | Germany . |
| 1 803 413 | 5/1969 | Germany . |
| 8619 907 | 10/1986 | Germany . |
| 37 43 086 | 6/1989 | Germany . |
| 39 21 704 | 3/1991 | Germany . |
| 4210681 | 10/1993 | Germany . |
| WO96/07831 | 3/1996 | WIPO . |

*Primary Examiner*—Thomas R. Hannon
*Attorney, Agent, or Firm*—Reising, Ethington, Barnes, Kisselle, Learman & McCulloch, P.C.

[57] ABSTRACT

A sliding bearing for supporting shafts and the like, with a bearing body made of plastic and a housing supporting the bearing body, where the sliding bearing essentially encloses the full circumference of the shaft. The bearing body (1) displays a slit (2) extending along the entire length of its axis and at least one deformable zone, likewise extending along the entire length of the axis, which allows the slit (2) to be opened so that the bearing body (1) can essentially be fitted to the shaft, and also removed from the shaft, in the radial direction. This drastically reduces the work involved in replacing the bearing body during repairs. The bearing body (1) can comprise individual webs (3) which are connected to one another via deformable zones designed as flexible film bridges (6) which can be locked in place in the housing by means of projections (7) provided on the webs (3).

12 Claims, 4 Drawing Sheets

PLAIN BEARING

FIELD OF THE INVENTION

The invention concerns a sliding bearing for mounting shafts and the like, with a bearing body made of plastic and a housing supporting the bearing body, where the sliding bearing essentially encloses the full circumference of the shaft.

BACKGROUND OF THE INVENTION

In previously known sliding bearings with plastic bearing bodies, the bearing body enclosing the full circumference of the shaft is designed in one piece. If the bearing body needs to be exchanged on account of wear or other damage, the shaft and the sliding bearing have to be completely dismantled, so that the bearing body can be removed from the shaft in the axial direction of the shaft. The new bearing body subsequently has to be slid onto the shaft in the axial direction and the entire shaft completely reassembled and adjusted. Such a procedure is extremely tedious and time-consuming, especially with shafts which run on multiple bearings and whose bearings can only be dismantled with difficulty.

SUMMARY OF THE INVENTION

The problem addressed by this invention is to create a sliding bearing which can be mounted on a shaft or the like far more easily.

In accordance with this invention, this problem is solved in that the bearing body displays a slit extending along the entire length of its axis and at least one deformable zone, likewise extending along the entire length of the axis, which allows the slit to be opened so that the bearing body can essentially be fitted to the shaft, and also removed from the shaft, in the radial direction.

Thus, in order to assemble or disassemble the bearing body, only the housing supporting the bearing body need be displaced axially on the shaft, so that access is provided to the bearing body, and the bearing body need subsequently only be removed from the shaft in the radial direction by opening the slit. In this context, the shaft is still supported by the other bearings provided and need not be disassembled in order to remove the damaged bearing body, meaning that the time and effort required for repair work on the respective machine is cut drastically. The new bearing body can, in turn, be fitted onto the shaft in the radial direction by opening the slit as far as necessary and then mounted in the housing after the slit has been closed, displacing it on the shaft in the axial direction if necessary.

Opening and closing of the slit is made possible by the deformable zone extending along the entire axial length of the bearing body. The deformability of this zone can be achieved in that the deformable zone displays a thinner wall thickness than the zone of the bearing body supporting the shaft. This zone can be designed as a film bridge, for example, where the film bridge can also display perforations. When the sliding bearing is assembled, the film bridge can likewise be positioned against the shaft or at a distance from it if the bearing body displays an appropriate wall thickness.

An example of the invention is described below and illustrated on the basis of the drawings. The drawings show the following:

BEST MODE FOR CARRYING OUT THE INVENTION

Figure 1A:
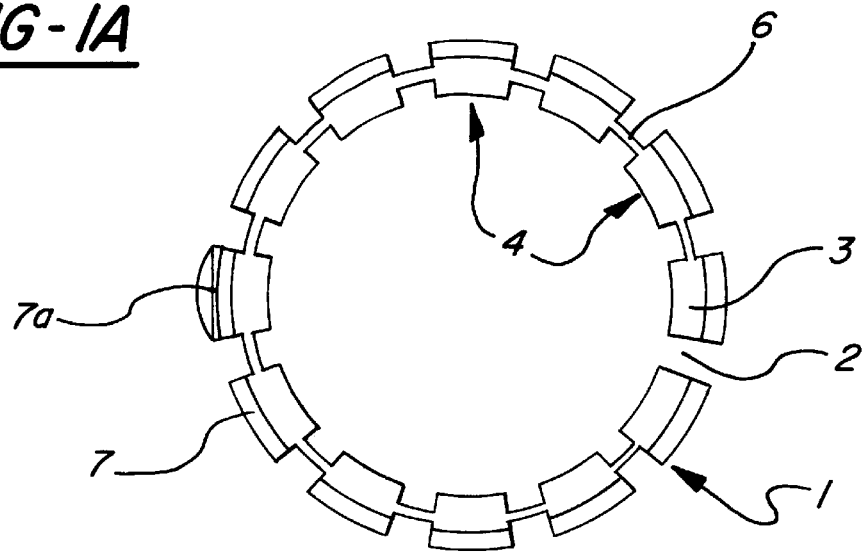
FIG. 1 A schematic representation of a first design of a bearing body, with segment-like sliding zones, in cross-section (top) and from the side (bottom), FIG. 2 A schematic representation of a bearing body according to FIG. 1 mounted in a housing, in cross-section (top) and in elevation (bottom), FIG. 3 A schematic representation of a second design of a bearing body, in cross-section (top) and from the side (bottom), and FIG. 4 A schematic representation of a bearing body according to FIG. 3 mounted in a housing, in cross-section (top) and in elevation (bottom).
Figure 1B:
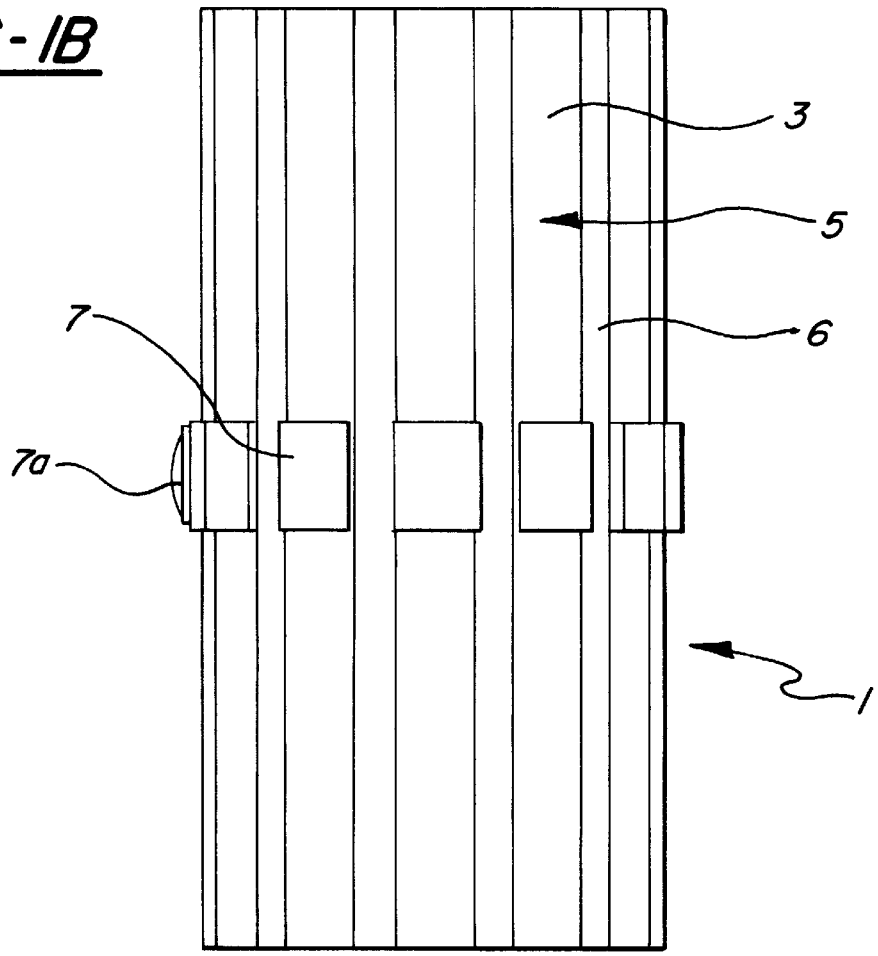

As shown in FIG. 1, the bearing body 1 made of low-slip plastic displays a slit 2 extending along its entire axial length. The sliding zone of the bearing body is split into several webs 3 extending in the axial direction of the bearing body, whose inner radial surfaces 4 create the sliding surface which comes into contact with the shaft which is mounted in the sliding bearing and not shown in more detail. The outer radial surfaces 5 of the webs 3 are positioned against the inner wall of the housing when the bearing body is mounted (see FIG. 2). The webs 3 are connected to each other by means of flexible film bridges 6, so that the slit 2 is can be opened or closed under deformation of the film bridges, thus allowing the bearing body 1 to be mounted on, and removed from, a shaft in the radial direction. The film bridges 6 can be designed in such a way that the outer diameter of the bearing body 1 in disassembled condition is greater than the inner diameter of the housing, so that the bearing body 1 can be inserted into the housing by applying elastic pretension to the film bridges and, when mounted in the housing, the webs 3 are in contact with the inner wall of the housing with slight pretension.

Splitting the sliding zone into the webs 3, and providing the slit 2, which is also open when the bearing body 1 is mounted, can compensate for expansion of the material.

Both the slit 2 and the webs 3, as well as the deformable film bridges 6, are oriented parallel to the longitudinal axis of the bearing body. When the bearing body 1 is mounted, the slit 2 displays a width which corresponds to the width of the film bridges 6.

Provided half-way along the length of the webs 3 are box-type projections 7, pointing radially outwards, by means of which the bearing body 1 can be secured in the axial direction, and one projection 7a with a greater radial length, by means of which the bearing body can be secured in the housing in non-rotating fashion.

Figure 2A:
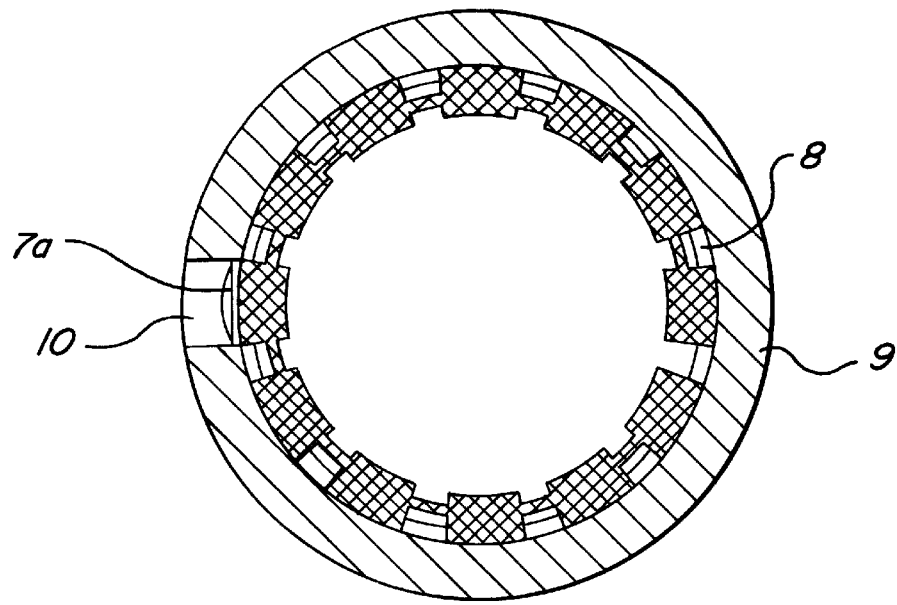
Figure 2B:
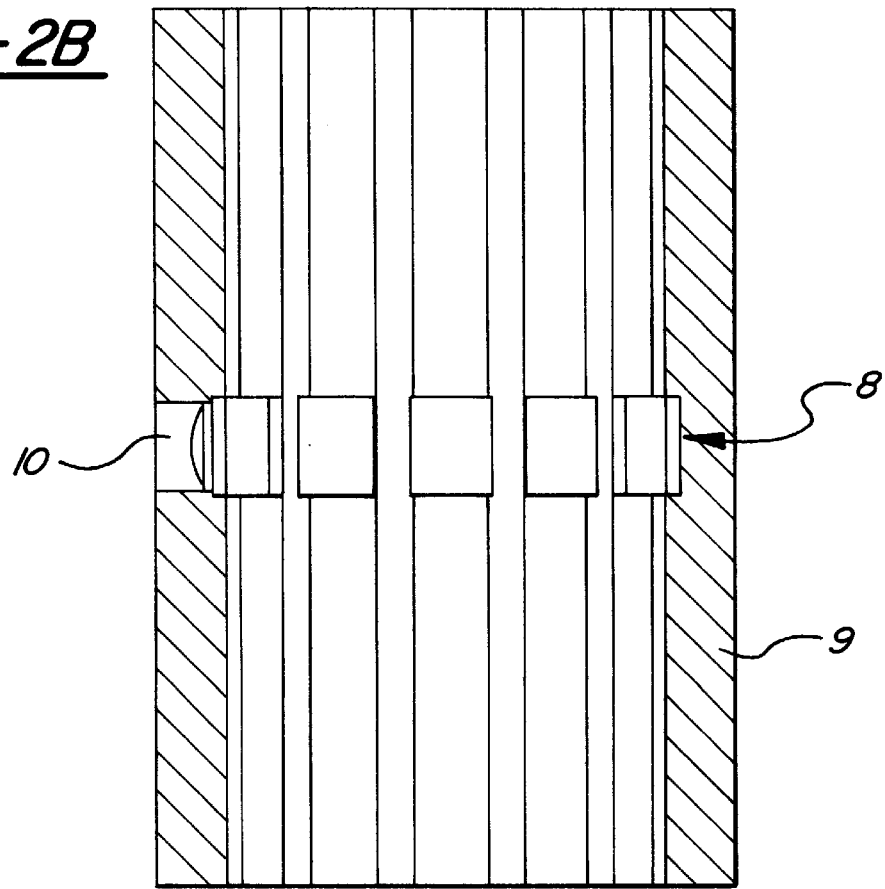

FIG. 2 shows a bearing body according to FIG. 1 mounted in a housing. The radial projections 7 on the outside of the bearing body 1 engage a circumferential groove 8 in the housing 9 and thus secure the bearing body 1 against axial displacement. On account of the elastic design of the film bridges 6, as well as the dimensions of the outer diameter of the bearing body 1 in disassembled condition, the outer surfaces 5 of the webs 3 are positioned against the inner wall of the housing 9 under pretension in such a way that the projections 7 lock into the groove 8.

In order to arrange the bearing body 1 in the housing 9 in non-rotating fashion, the housing 9 is provided with a through-hole 10 in which the projection 7a engages. At the same time, this secures the bearing body in the axial direction. Alternatively, the projections 7 or the webs 3 can also be provided with recesses or indentations, for example, in which the projections arranged on the housing can engage. The through-hole 10 can also be designed as a pocket open towards the bearing body 1 or as a groove extending in the axial direction.

The bearing body mounted radially on a shaft by opening the slit can be positioned against the shaft by narrowing the slit, so that the housing 9 can be slid along the shaft in the axial direction and onto the bearing body 1, until the projections 7 engage the groove 8 of the housing. The bearing body 1 can subsequently be rotated in the housing 9 until the projection 7a engages the through-hole 10. Providing means for securing the bearing body in the housing in non-slip and non-rotating fashion, which lock in place in the housing one after the other, allows the bearing body to be fixed in the housing in a stable and easily manageable fashion.

Figure 3A:
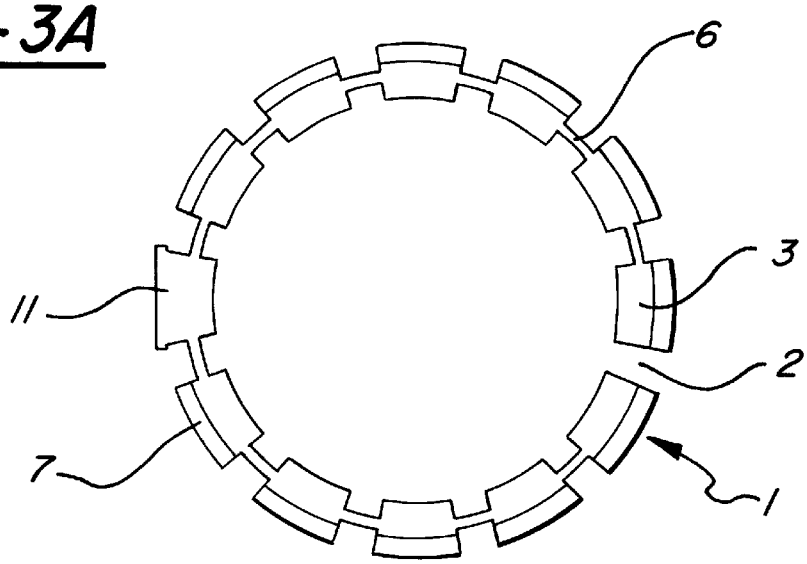
Figure 3B:
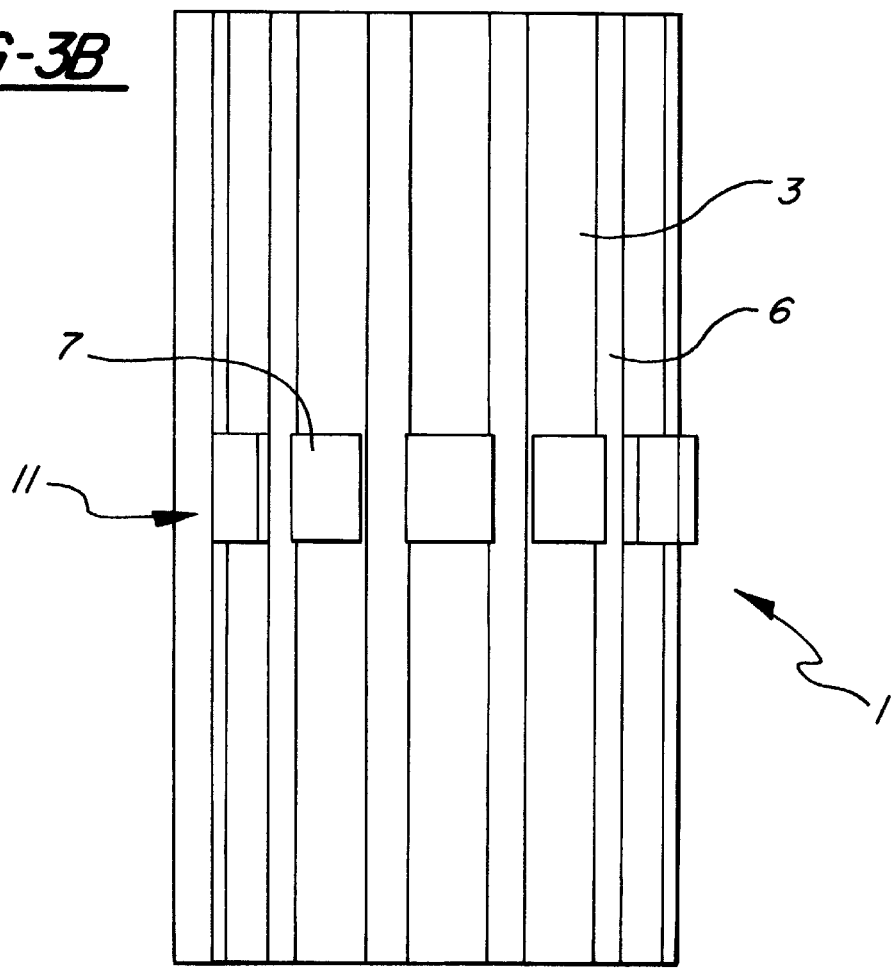
Figure 4A:
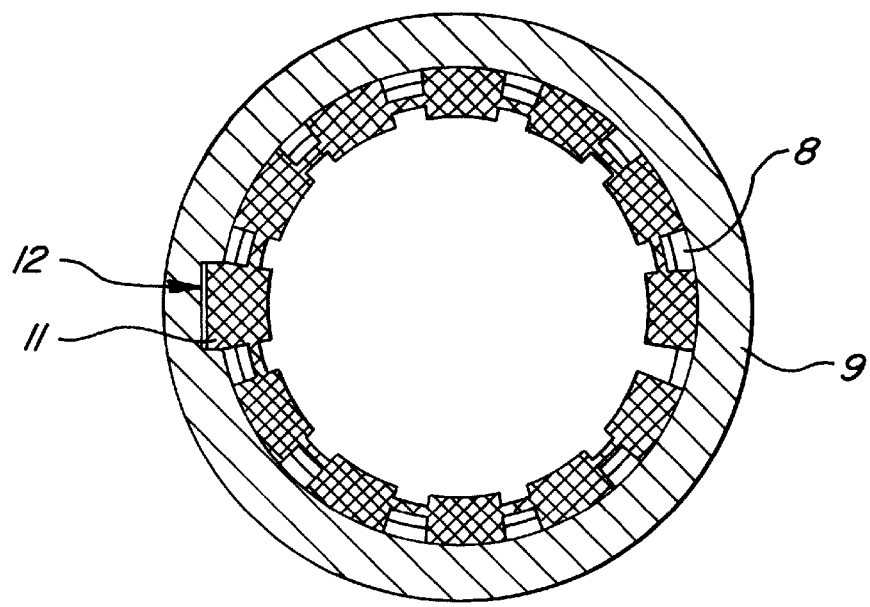
Figure 4B:
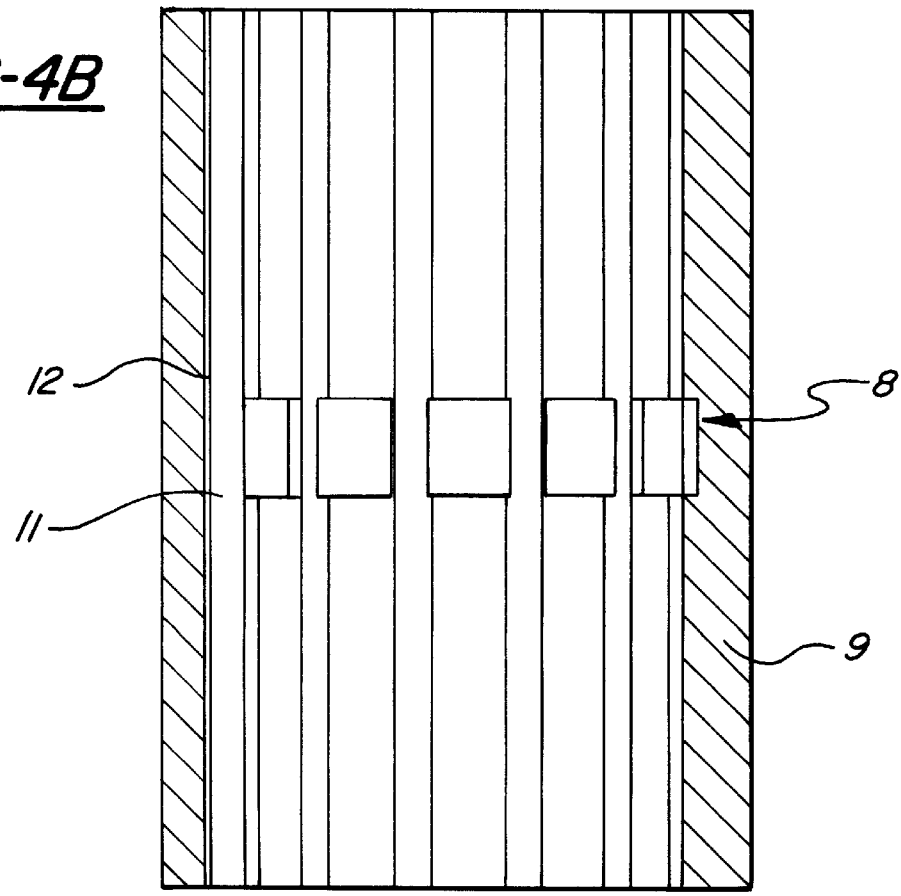

The configuration shown in FIGS. 3 and 4 represents a bearing body 1 in which the projection securing the bearing body 1 in the housing 9 in non-rotating fashion is designed as a ridge 11 which can be accommodated by a longitudinal groove 12 in the housing 1 and which extends the entire length of the bearing body 1 or the webs 3. The bearing body 1 is guided axially into the housing 9 by the ridge 11 in the groove 12, until the projections 7 engage the circumferential groove 8, thus securing the bearing body 1 in the housing 9 in the axial direction. The bearing body 1 and the housing 9 correspond to the practical example according to FIGS. 1 and 2 in all other respects.

EQUIVALENT OR ALTERNATE DESIGNS

The bearing body and the deformable zone(s) can also be made of materials with different moduli of elasticity. The zone, which allows the two adjacent zones of the bearing body to be angled relative to each other so that the slit can be opened and closed, can be connected to the adjacent zones of the bearing body to form a single unit by bonding or integral-molding, for example.

A slitted zone can also be interpreted as the deformable zone as defined by the present invention, so that, for example, the bearing body essentially comprises two separable shells which can be joined to form a bearing body. In this context, corresponding means can be provided which prevent the shells from shifting relative to each other. For instance, if the wall of the bearing body is sufficiently thick, corresponding pins and recesses can be arranged on the opposite face ends extending in the axial direction of the bearing body. The narrow ends of the two or more segments forming the bearing body can also be fitted with teeth or the like which prevent the segments shifting relative to each other when the bearing body is assembled. Corresponding means for securing the segments can also be provided on the housing.

Furthermore, the bearing body can also be made of a low-friction material which displays sufficient elasticity for the bearing body to essentially be designed as a slit tube, where the slit can be opened by deformation essentially distributed uniformly around the circumference of the bearing body in such a way that the bearing body can be attached to the shaft in the radial direction. Such materials can be created, for example, using plastic alloys of materials which are elastic, on the one hand, and essentially friction-reducing, on the other.

The slit and the deformable zone of the bearing body advantageously run parallel to the longitudinal axis of the bearing body. Furthermore, the slit and the deformable zone of the bearing body can be arranged opposite each other on the circumference of the bearing body, so that the bearing body comprises two shells of equal size which can be angled relative to each other. The slit can, however, also be of undulating or helical design.

The bearing body can display individual, segment-like sliding zones, where the deformable zones are designed as flexible film bridges connecting the sliding zones. By designing the bearing body with several segment-like sliding zones which jointly support the shaft, the bearing simultaneously displays particularly good running properties, as material expansion of the bearing body resulting from humidity or heat can be distributed in the circumferential direction of the sliding bearing. The film bridges which join the sliding segments to each other in such a design are expediently molded on the edges of the sliding segments in such a way that both the inner and outer circumference of the bearing body display recesses. This provides sufficient freedom for the flexible film bridges to possibly fold together in the event that the sliding segments expand in the circumferential direction as a result of fluctuations in temperature and/or humidity. In addition, abraded bearing material, lubricant and the like can be caught in recesses facing the shaft. The segment-like sliding zones are preferably designed as webs essentially extending along the axial direction of the sliding bearing, although they may also be designed in helical form or the like.

Based on a cylindrical bearing body in assembled condition, the slit can be positioned in one of the flexible film bridges. One of the film-like areas can also be left out to create the slit. The slit may already be formed during the manufacture of the sliding bearing, by means of a correspondingly designed injection mold or the like, although the slits can also be made in the prefabricated bearing body in a subsequent step.

If the bearing body displays multiple segment-like sliding zones and deformable zones joining these to one another, such as flexible film bridges, the bearing body can adapt to the inner contours of the housing. This dispenses with the need for the bearing bodies to be manufactured in such a way that their inner and outer circumferential surfaces are so accurately dimensioned that they can be fitted exactly into the housing, as is the case in bearing bodies with essentially rigid shells, for example. Thus, less accuracy is demanded of the dimensions of the bearing body than in the case of essentially rigid bearing bodies. This allows a particularly good match between the bearing body and the housing, particularly when the slit extending the full length of the axial dimension of the bearing body is still open when the bearing body is mounted, and changes in the dimensions of the bearing body on account of temperature and/or humidity fluctuations can also be compensated for via the open slit.

The bearing body can advantageously be fixed in the housing in locking fashion in the direction of motion of the shaft and/or perpendicular thereto. Corresponding locking means can be provided on the outer radial side of the bearing body to this end. In the case of shafts which move linearly, motion with a component mounted perpendicular to the shaft represents rotary motion, for example.

The bearing body can be designed in such a way that its outer circumference displays at least one essentially radial projection, where a recess, in particular a circumferential groove, corresponding to the projection is provided on the housing into which the projection can be inserted, thus locking the bearing body in the axial direction relative to the housing. In this context, the bearing body can be inserted into the housing in the axial direction under radial deformation of the housing, for example. In order to engage the locking means of the bearing body in the corresponding fittings of the housing, the bearing body can be designed in such a way that its outer diameter in dismantled condition is dimensioned to be identical to, or, in particular, greater than the inner diameter of the housing, meaning that the diameter of the bearing body is reduced when radial or tangential pressure is applied and the bearing body is thus pretensioned in resilient form. This can be facilitated in that the slit displays sufficient width that closing the slit adequately reduces the outer diameter of the bearing body. The bearing body deformed in this manner can then be inserted into a housing in the axial direction, where it springs back as the pressure decreases and is positioned against the inside of the housing without or, advantageously, with continuing pretension.

The housing can also display a groove open on its face end, into which a projection located on the bearing body and facing outwards can be inserted in the axial direction. The bearing body can also be secured in place in the housing by means of one and the same locking means, both with rotating shafts and shafts which can be axially displaced relative to the sliding bearing.

The bearing body can be secured both in the axial direction and in the tangential direction, i.e. both for an axially displaceable shaft and a rotating shaft, in that the housing displays a through-hole and the bearing body displays a recess which can be aligned with it and that the bearing body can be secured in the housing in such a manner that it can neither rotate nor be displaced by means of a fastening element which fits into the through-hole and the recess. The recess can also be designed as a groove running in the axial direction of the sliding bearing between web-like sliding zones, thus forming a film bridge.

In order to be able to disassemble both the bearing body and the housing with the least effort, thus considerably facilitating repair work, the housing can be designed in multiple-shell form, particularly with two shells, where means are provided for securing the housing shells to one another. Such means can, for example, be designed as corresponding pins and recesses. Corresponding locking means or additional fastening elements can also be provided, so that the housing already provides the bearing body with sufficient support. The means for securing the housing shells to one another can also be designed as simple aids, where the forces acting on the sliding bearing can be absorbed by the components supporting the sliding bearing.

Although the description of this invention has been given with reference to a particular embodiment, it is not to be construed in a limiting sense. Many variations and modifications of the invention will now occur to those skilled in the art. For a definition of the invention, reference is made to the appended claims.

What is claimed is:

1. In a sliding bearing for mounting a shaft, said bearing being of the type having a bearing body (1) made of plastic and a housing body (9) supporting the bearing body, the bearing body being adapted to be disposed around the shaft and extending axially thereof, the bearing body (1) having a slit (2) extending along the entire length and at least one deformable zone (6) extending along the axis whereby the slit (2) can be opened so that the bearing body (1) can be disposed around the shaft and also removed from the shaft in the radial direction, the improvement comprising:

a first interlock for restraining axial motion of said bearing body (1) relative to said housing body (9) comprising a first radial projection (7) on said bearing body and a circumferential groove (8) in the housing body, said projection and groove being located relative to said bodies so that said projection can move radially into said groove when the bearing body is in a predetermined axial position relative to said housing body, a second interlock for restraining relative rotary motion of said bearing body and said housing body, said second interlock comprising a recess (10,12) in one of said bodies and a second radial projection (7a, 11) on the other of said bodies for insertion into said recess when said bodies are in a predetermined rotative position relative to each other, whereby said first and second interlocks may be engaged in sequence.

2. A sliding bearing as defined in claim 1, wherein: the slit (2) and the deformable zone (6) extend parallel to the longitudinal axis of the bearing body (1).

3. A sliding bearing as defined in claim 1 or 2 wherein: the bearing body (1) comprises individual, segment-like sliding zones (3) and the deformable zones are flexible film bridges (6) joining the sliding zones (3) to one another.

4. A sliding bearing as defined in claim 3 wherein: the slit (2) is located in one of the film bridges (6).

5. A sliding bearing as defined in claim 3 wherein: there is a film bridge (6) joining all but one adjacent pairs of sliding zones (3).

6. A sliding bearing as defined in claim 1 or 2 wherein: the bearing body (1) is in a state of pretension when installed inside of the housing body (2).

7. In a sliding bearing as defined in claim 1 or 2 wherein: the bearing body (1) comprises individual, segment-like sliding zones (3) and the deformable zones are flexible film bridges (6) joining the sliding zones (3) to one another, and the bearing body (1) is in a state of pretension when installed against the inside of the housing (2) with continuing pretension.

8. A sliding bearing as defined in claim 1 wherein: said second radial projection is a ridge (11) extending in the axial direction and said recess is shorter in the axial direction than said bearing body, said ridge being short enough in the axial direction to fit inside said recess.

9. A sliding bearing as defined in claim 1 wherein: said second radial projection is a ridge (11) insertable into said recess extending in the axial direction and said recess is a groove (12) extending in the axial direction, said groove being open-ended at one of the ends of said bearing body.

10. A sliding bearing as defined in claim 1 wherein: said second radial projection (7a) is of greater radial length than the first radial projection (7).

11. A sliding bearing as defined in claim 1 wherein: the housing body (9) comprises plural shells and securing means are provided for securing the housing shells to one another.

12. In a sliding bearing for mounting a shaft, said bearing being of the type having a bearing body (1) made of plastic and a housing body (9) supporting the bearing body, the bearing body being adapted to be disposed around the shaft and extending axially thereof, the bearing body (1) having a slit (2) extending along the entire length and at least one deformable zone (6) extending along the axis whereby the slit (2) can be opened so that the bearing body (1) can be disposed around the shaft and also removed from the shaft in the radial direction, the improvement wherein:

the housing body (9) includes at least one through-hole and the bearing body (1) includes at least one recess which can be aligned with said through-hole and a fastening element disposed in the through-hole and the recess for securing the bearing body (1) in the housing body (9) against rotational and axial motion.

* * * * *